United States Patent
Birman et al.

(10) Patent No.: US 10,365,130 B2
(45) Date of Patent: Jul. 30, 2019

(54) HIGH LIGHT EFFICIENCY POINTER ILLUMINATION

(71) Applicant: Continental Automotive Systems, Inc., Auburn Hills, MI (US)

(72) Inventors: Vyacheslav B Birman, Auburn Hills, MI (US); Guoqing Wang, Rochester Hills, MI (US); Shirley Yu, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 232 days.

(21) Appl. No.: 14/976,457

(22) Filed: Dec. 21, 2015

(65) Prior Publication Data

US 2017/0176224 A1    Jun. 22, 2017

(51) Int. Cl.
   *G01D 13/26* (2006.01)
   *G01D 11/28* (2006.01)

(52) U.S. Cl.
   CPC ........... *G01D 13/265* (2013.01); *G01D 11/28* (2013.01)

(58) Field of Classification Search
   CPC ....... G01D 13/265; G01D 11/28; G01D 13/22
   USPC ..................................................... 362/23.14
   See application file for complete search history.

(56) References Cited

U.S. PATENT DOCUMENTS

| 2007/0139905 | A1* | 6/2007 | Birman | B60K 37/02 362/23.07 |
| 2009/0154136 | A1* | 6/2009 | Harada | G01D 11/28 362/23.15 |
| 2011/0038137 | A1* | 2/2011 | Ishikawa | G01D 11/28 362/23.14 |
| 2015/0151668 | A1* | 6/2015 | Birman | G01D 11/28 362/23.21 |

* cited by examiner

*Primary Examiner* — Anh T Mai
*Assistant Examiner* — Jessica M Apenteng

(57) ABSTRACT

A pointer for an instrument cluster assembly of a motor vehicle is provided. The pointer includes a pointer arm and a light distributor formed of light conducting material. The pointer arm has a proximal end and a distal end. The light distributor is disposed at the proximal end. The light distributor has a light receiving side and a light reflecting surface. The light distributor is configured to receive rays through the light receiving side. The light reflecting surface is configured to reflect rays into the pointer arm. The light receiving side has an inner portion and an outer portion. The inner portion is disposed closer to the distal end of the pointer arm than the outer portion is with respect to the distal end. Angled surfaces are disposed on the inner portion. The angled surfaces are configured to refract rays toward the light reflecting surface.

6 Claims, 5 Drawing Sheets

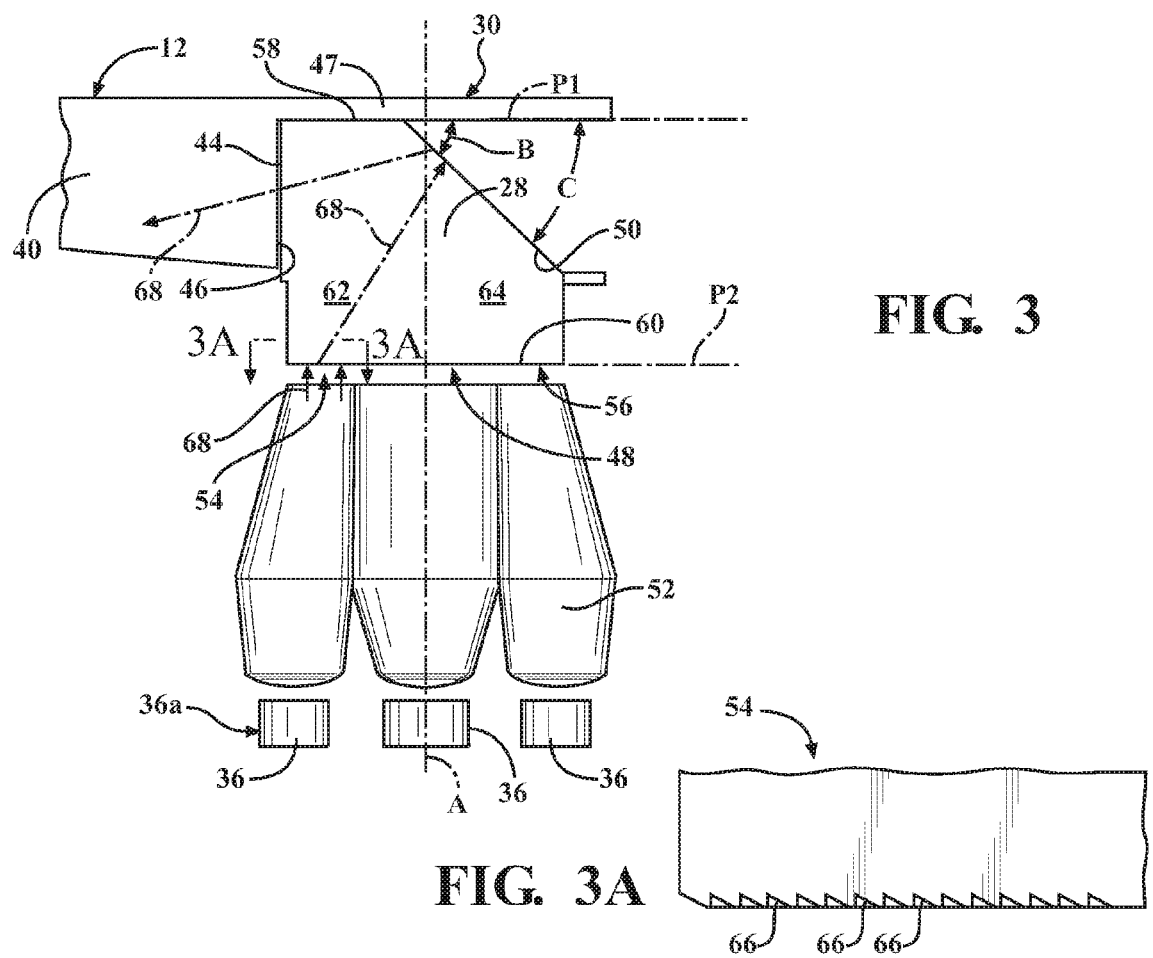
FIG. 3
FIG. 3A
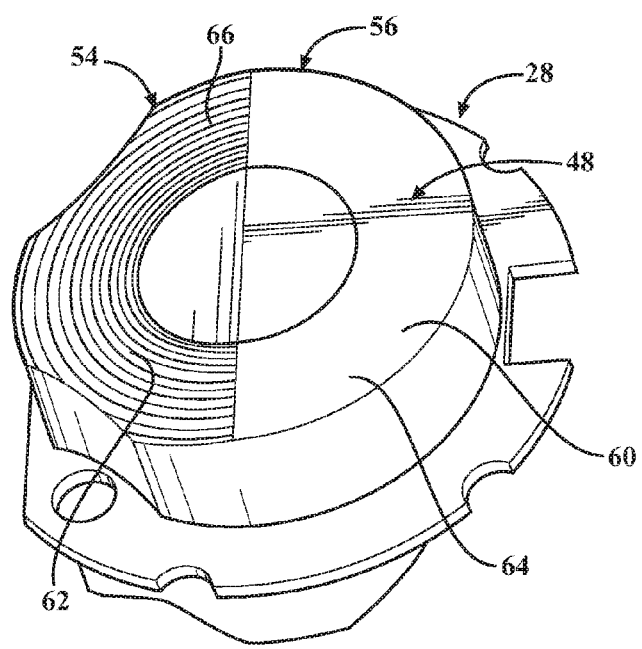
FIG. 3B

HIGH LIGHT EFFICIENCY POINTER ILLUMINATION

TECHNICAL FIELD

The present disclosure relates to vehicle instrument clusters and gauges, and more specifically to a pointer for a vehicle instrument cluster and gauge that includes features for increasing efficiency.

BACKGROUND

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include instrument panels with several gauges and dials that communicate vehicle conditions such as speed, engine rpm, temperature, oil pressure along with many other operational parameters.

Each vehicle gauge typically includes a pointer that rotates about an axis to point to a specific graphic on the gauge dial to indicate a current vehicle operating parameter. Pointer assemblies can be illuminated. Light sources that are not orientated along the axis of rotation provide different amounts of light for each rotational position of the pointer assembly. As the pointer rotates, typically (in the case of rear pick up pointers) only the light sources that are on an outer side of the rotational axis from the pointer arm will provide light that is directed into the pointer arm. The light from light sources disposed on a side of the rotational axis that is next to the pointer arm (the inside light sources, as the pointer rotates) is typically wasted entirely because it never reaches a reflecting surface to conduct the light into the pointer needle.

It is desirable to provide and develop pointer assemblies that provide substantially uniform illumination at any position about the axis of rotation relative to the dial gauge surface and to use as much of the light from the light sources as possible. Accordingly, it is desirable to design and develop a pointer assembly and gauge that provides efficient illumination, utilizing as much light as possible.

SUMMARY

A pointer is included that provides for increased light distribution efficiency. A plurality of angled surfaces offset from an axis of rotation are used to refract light through a light distributor and subsequently into the pointer arm. These angled surfaces are disposed on an inner side of the light distributor, which is adjacent to the pointer arm. The angled surfaces refract rays of light toward a reflecting surface of the light distributor, in order to reflect the rays into the pointer arm. In this way, light originating from the pointer arm side of the rotational axis is not all wasted. In some cases, 10-20% of the light originating on the inner side of the pointer can be refracted toward the light reflecting surface to be used for illuminating the pointer arm.

In one form, which may be combined with or separate from the other forms provided herein, a pointer for an instrument cluster assembly of a motor vehicle is provided. The pointer includes a pointer arm formed of a light conducting material. The pointer arm has a proximal end and a distal end. A light distributor is disposed at the proximal end of the pointer arm. The light distributor is formed of light conducting material. The light distributor has a light receiving side and a light reflecting surface. The light distributor is configured to receive rays of light from a light source through the light receiving side. The light reflecting surface is configured to reflect the rays into the pointer arm. The light receiving side has an inner portion and an outer portion. The inner portion is disposed a first distance from the distal end of the pointer arm, and the outer portion is disposed a second distance from the distal end of the pointer arm. The second distance is greater than the first distance. The light receiving side comprises a plurality of angled surfaces disposed on the inner portion. The angled surfaces are configured to refract rays toward the light reflecting surface.

In another form, which may be combined with or separate from the other forms described herein, an instrument cluster assembly for use in an automobile is provided. The instrument cluster assembly includes a pointer supported for rotation about an axis of rotation. The pointer has a pointer arm formed of a light conducting material. The pointer arm has a proximal end and a distal end, and a light distributor disposed at the proximal end of the pointer arm. The light distributor is disposed over the axis of rotation. The light distributor is formed of light conducting material. The light distributor has a light receiving side and a light reflecting surface. The light receiving side has an inner portion and an outer portion. The inner portion is disposed a first distance from the distal end of the pointer arm, and the outer portion is disposed a second distance from the distal end of the pointer arm. The second distance is greater than the first distance. The light receiving side comprises a plurality of angled surfaces disposed on the inner portion. A plurality of light sources is configured to emit rays of light toward the light receiving side of the light distributor. The plurality of light sources is offset from the axis of rotation. The light distributor is configured to receive rays from the plurality of light sources through the light receiving side. The angled surfaces are configured to refract rays toward the light reflecting surface. The light reflecting surface is configured to reflect the rays into the pointer arm.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

FIG. 3 is a cross-sectional view of the example instrument cluster assembly of FIGS. 1-2, in accordance with the principles of the present disclosure;

FIG. 3A is a close-up side view of a portion of a light distributor of the pointer of the instrument cluster shown in FIGS. 1-3, according to the principles of the present disclosure;

FIG. 3B is a perspective view of the light distributor of the pointer shown in FIGS. 1-3A, according to the principles of the present disclosure;

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1:
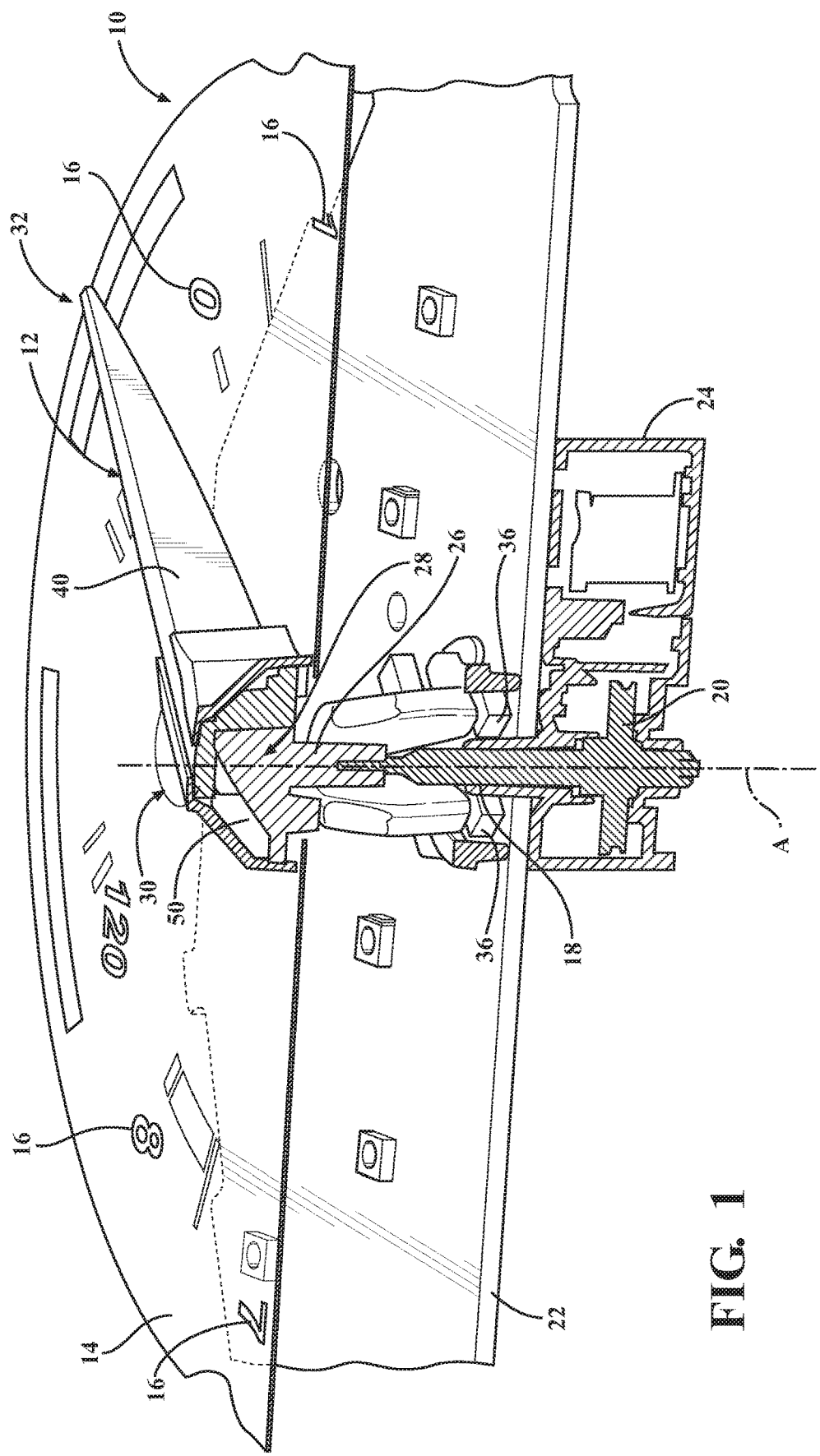
FIG. 1 is a sectional perspective view of an example instrument cluster assembly having a pointer, in accordance with the principles of the present disclosure.

Referring to FIG. 1, an instrument cluster assembly is illustrated and generally designated at 10. The instrument cluster assembly 10 may be used in a motor vehicle, by way of example. Information given by the instrument cluster assembly 10 may include, by way of example, tachometer information, vehicle speed information, fuel level information, engine temperature, or any other information that is desired to communicate to the driver of the vehicle.

The instrument cluster assembly 10 includes a pointer 12 that is configured to rotate about an axis of rotation A, wherein the axis of rotation A extends through an appliqué surface 14 to indicate a specific operating parameter. Several indicia 16, such as RPM values, speed values, or fuel level markers, are located on the appliqué surface 14. The indicia 16 are disposed in a generally circular pattern about the axis of rotation A. In this example, the indicia 16 are disposed over a portion of an invisible circle that surrounds the axis of rotation A, but it should be understood that the indicia 16 may be disposed around more of the axis of rotation A, such as in an entire circle around the axis of rotation A, or in another pattern that is not centered around the axis of rotation A.

The pointer 12 is configured to rotate or move with respect to the appliqué surface 14, about the axis A. For example, the pointer 12 may be mounted to a shaft 18 that is connected to and driven by a stepper motor 20. In this example, the driving shaft 18 is disposed on the rotational axis A. The stepper motor 20 may be mounted to, mechanically connected to, and/or electrically connected with a printed circuit board 22. In the illustrated example, the stepper motor 20 is mounted to the printed circuit board 22 through a motor housing 24. The stepper motor 20 is configured to rotate the shaft 18 that is coaxial with the axis of rotation A. The shaft 18 is fixedly connected to a stem 26 of the pointer 12, so that the pointer 12 rotates with the shaft 18. Thus, the pointer 12 is supported for rotation about the axis of rotation A. The stem 26 extends from a light distributor 28 of the pointer 12. The pointer may rotate about 240 degrees, about 260 degrees, about 270 degrees, or even all around 360 degrees, by way of example.

The pointer 12 is a light guide. For example, the pointer 12 may be formed of a light conducting material that is configured to receive rays of light and conduct the rays therethrough. The pointer 12 has a pointer arm 40, which has a proximal end 30, or inner end, disposed adjacent to the axis of rotation A and a distal end 32, or outer end, disposed farther away from the axis of rotation A than the proximal end 30 is from the axis of rotation A, at the outer tip of the pointer arm 40.

A plurality of LED packages 36 is configured to provide light to the pointer 12. The LED packages 36 are disposed directly on the PCB 22, in this example. The LEDs 36 are disposed in a circular pattern around the axis of rotation A and are offset from the axis of rotation A. The LED packages 36 are disposed adjacent to the proximal end 30 of the pointer 12. The pointer 12 is thus illuminated by the light sources 36 that are disposed about the axis A, and not along the axis A. Because the LEDs 36 are disposed about the axis A, different rotational positions of the pointer 12 expose the pointer 12 to different amounts of light and to different of the LEDs 36. The example pointer 12 is provided with features that reflect the light to provide for the substantially uniform distribution and propagation of light along the entire pointer 12. Any suitable number of LED packages 36 may be used, such as three, four, or six LEDs 36, by way of example.

Figure 2:
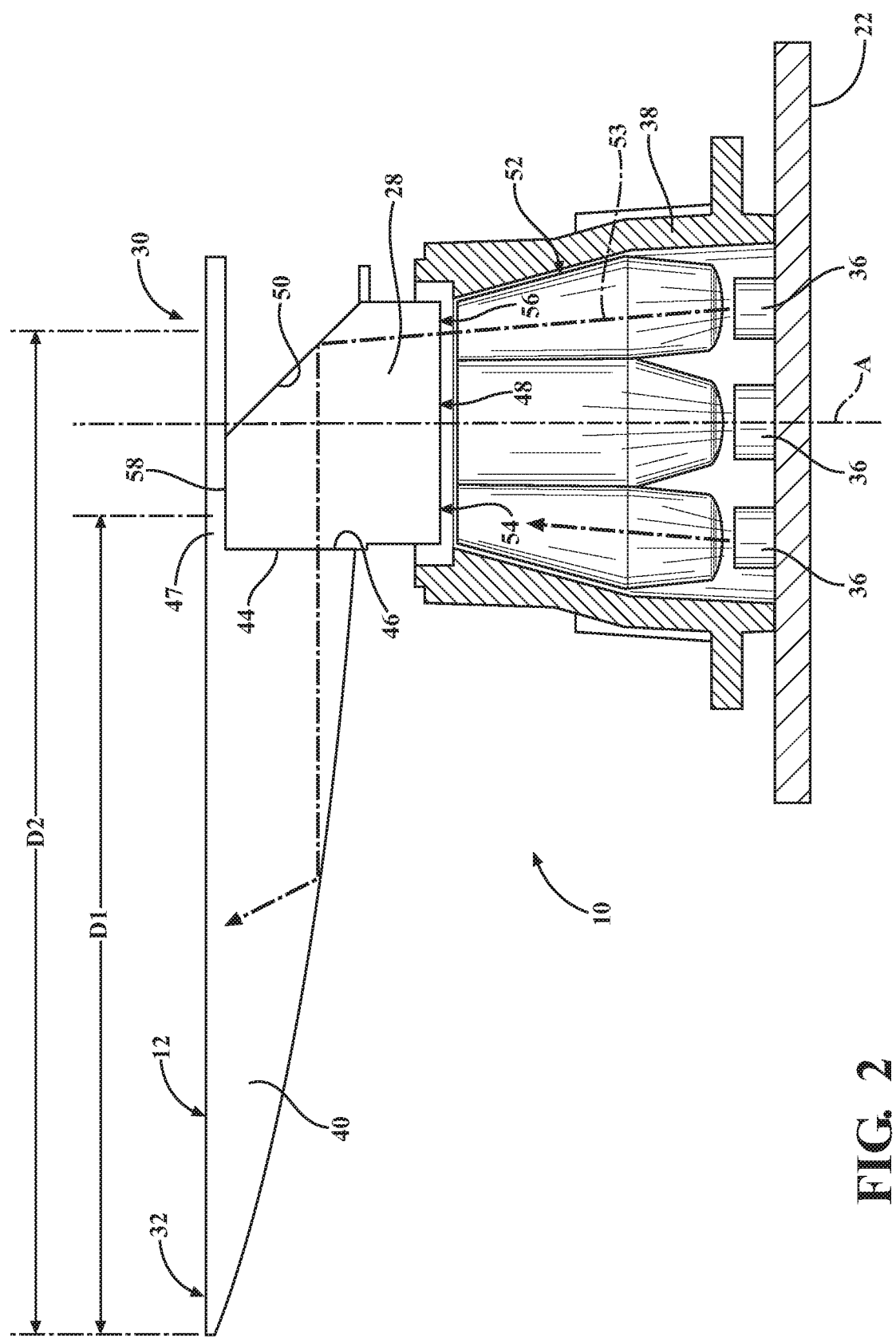
FIG. 2 is a cross-sectional view of a portion of the example instrument cluster assembly of FIG. 1, according to the principles of the present disclosure.

Referring to FIG. 2, the LED packages 36 are disposed within a light housing 38. The light housing 38 surrounds the axis A and the shaft 18, and also provides space for the plurality of light sources 36. The light housing 38 provides for the blocking or confinement of light as it propagates upward into the pointer 12.

The example pointer 12 is provided with features that reflect the light provided by the LED packages 36 to provide for the substantially uniform distribution and propagation of light along the entire body of the pointer 12, including through the light distributor 28 and along the pointer arm 40. A pointer cap (not shown) may be mounted to the pointer arm 40 at the proximal end 30. The pointer arm 40 is supported on the light distributor 28 that attaches to the shaft 18 of the stepper motor 20.

The pointer arm 40, as well as the light distributor 28, are formed of a light conducting material. The light distributor 28 is disposed at the proximal end 30 of the pointer arm 40. The light distributor 28 may be attached to the pointer arm 40 or connected to the pointer arm 40 in any suitable way. A side surface 44 of the light distributor 28 maybe abutted against and in contact with a side surface 46 of the pointer arm 40. In some variations, the side surface 44 does not contact the side surface 46, but instead, the side surfaces 44, 46 may merely be disposed adjacent to each other and facing each other. The side surfaces 44, 46 may be parallel to each other. In some examples a top part 47 of the pointer arm may be disposed on and attached to a top surface 58 of the light distributor 28.

The light distributor 28 has a light receiving side 48 and a light reflecting surface 50. A light-collecting light guide 52 is disposed adjacent to the light receiving side 48 of the light distributor 28. The light-collecting light guide 52 is configured to collect rays 53, 68 originating with one or more of the LEDs 36 and conducts the rays 53, 68 to the light distributor 28 (see FIG. 4). Some of the rays 53 are then totally internally reflected within the light distributor 28 by the light reflecting surface 50 toward and into the pointer arm 40. Thus, the light distributor 28 is configured to receive rays 53 from at least one light source 36 through the light receiving side 48, and the light reflecting surface 50 is configured to reflect the rays 53 into the pointer arm 40. (Additional rays 68 may also be received within the light distributor 28 and reflected by the light reflecting surface 50, as explained below).

Figure 3C:
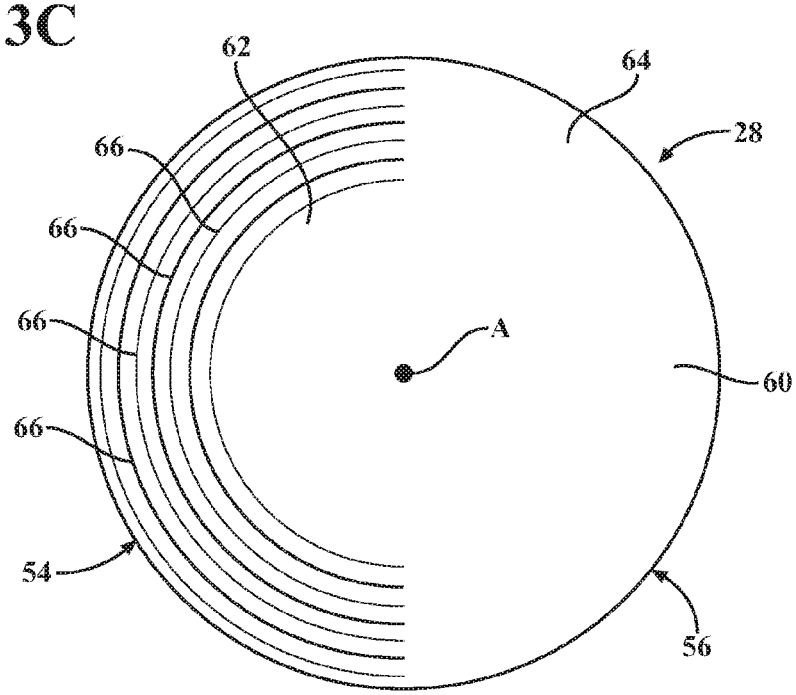
FIG. 3C is a bottom view of the light distributor of the pointer shown in FIGS. 1-3B, according to the principles of the present disclosure.

Referring now to FIGS. 2-3 and 3A, the light receiving side 48 has an inner portion 54 and an outer portion 56. The inner portion 54 is disposed a first distance d1 from the distal end 32 of the pointer arm 40, and the outer portion 56 is disposed a second distance d2 from the distal end 32 of the pointer arm 40. The second distance d2 is greater than the first distance d1. The inner portion 54 is located on one side of the axis of rotation A, while the outer portion 56 is located on an opposite side of the axis of rotation A. The inner portion 54 is located closer to the distal end 32 of the pointer arm 40 than the distal end 32 is located with respect to the axis of rotation A. In other words, the inner portion 54 is on the pointer arm 40 side of the axis of rotation A; and the inner portion 54 is located between the axis of rotation A and the distal end 32 of the pointer arm 40.

The light distributor 28 has a top surface 58 that is disposed along a plane P1 having an angle B with respect to the light reflecting surface 50. The angle B between the light reflecting surface 50 and the plane P1 of the top surface 58 may be in the range of about 30 degrees to about 60 degrees. More preferably, the angle B is in the range of about 40 degrees to about 50 degrees. In some examples, the angle B is about 45 degrees. Disposing the light reflecting surface 50 at the angle B allows the light reflecting surface 50 to totally internally reflect rays 53 in a transverse direction (or an approximately horizontal direction in the orientation of FIGS. 2 and 3A) along the pointer arm 40 to be viewed from above the pointer arm (in the orientation of FIGS. 2-3; when the instrument cluster assembly 10 is installed in a motor vehicle, the instrument cluster assembly 10 would normally be rotated so that a driver looks forward toward the pointer arm 40, rather than downward onto the pointer arm 40 and appliqué surface 14).

A first side 62 of the light distributor 28 comprises the top surface 58 and the inner portion 54 of the light receiving side 48, and a second side 64 of the light distributor 28 comprises the light reflecting surface 50 and the outer portion 56 of the light receiving side 48. The outer portion 56 may comprise a flat surface 60 that lies in a plane P2 that is substantially parallel with the plane P1 of the top portion 58. The light reflecting surface 50 is disposed at an angle C with respect to a plane parallel with the plane P2 of the flat surface 60 of the outer portion 56 of the light receiving side 48. In this case, the plane P1 is parallel with the plane P2 of the flat surface 60, and therefore, the angle C is equal to the angle B. Thus, the angle C may be any suitable size, but is preferably in the range of about 30 degrees to about 60 degrees, more preferably in the range of about 40 degrees to about 50 degrees, and may be about 45 degrees.

Referring to FIGS. 3 and 3A-3D, the light receiving side 48 comprises a plurality of angled surfaces 66 disposed on the inner portion 54. The angled surfaces 66 are configured to refract rays 68 toward the light reflecting surface 50. The rays 58 originate from an LED 36a that is located on the pointer arm 40 side of the axis of rotation A. In other words, rays 68 originate from and LED package 36 that is disposed between the axis of rotation A and the distal end 32 of the pointer 12. As the pointer arm 40 rotates about the axis of rotation A, the LEDs 36 that are located between the axis of rotation A and the distal end 32 of the pointer arm 40 will change.

On the outer portion 56 of the light receiving side 48 of the light distributor 28, the rays 53 coming into the light distributor 28 may be conducted straight through the outer portion 56 without refracting the rays 53. Accordingly, the rays 53 are directed to the reflecting surface 50 and totally internally reflected toward the pointer arm 40. On the other hand, for rays 68 coming into the light distributor 28 on the inner portion 54 of the light reflecting side 48, the rays 68 would never reach the light reflecting surface 50 if the rays 68 were conducted straight through the inner portion 54. Without the angled surfaces 66, moreover, the rays 68 would be conducted straight through the inner portion 54 of the light distributor 28, and they would reach the top surface 58 and not be conducted or reflected transversely along the pointer arm 40. However, with the addition of the angled surfaces 66, at least some rays 68 are refracted by the angled surfaces 66 toward the light reflecting surface 50 and totally internally reflected by the light reflecting surface 50 into and along the pointer arm 40. Accordingly, in some variations, 10-20% of the rays 68 that would otherwise have been lost or wasted are reflected along the pointer arm 40 from the inner portion 54.

Figure 3D:
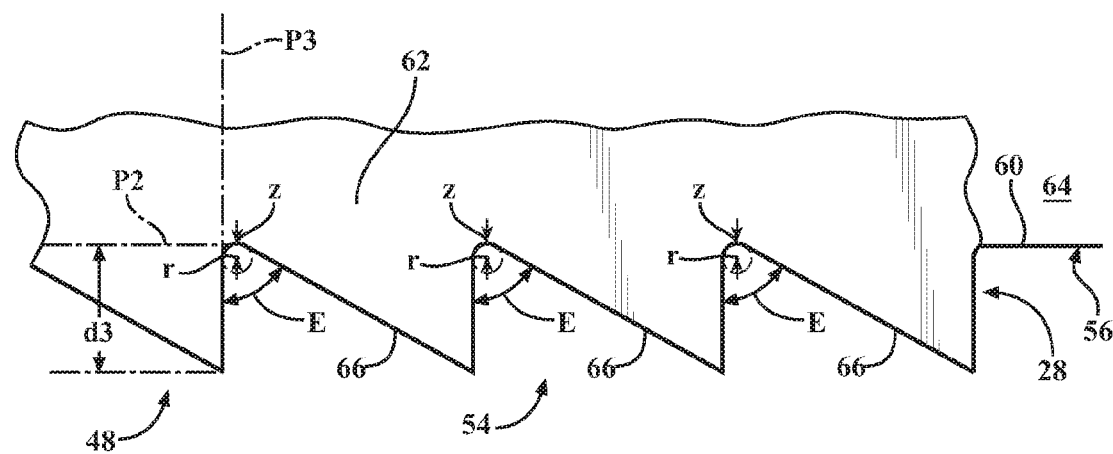
FIG. 3D is a cross-sectional view of a portion of the light distributor of the pointer shown in FIGS. 1-3C, in accordance with the principles of the present disclosure.

Referring to FIG. 3D, the angled surfaces 66 of the inner portion 54 of the light receiving side 48 are each disposed at an angle E with respect to a plane P3 perpendicular to the plane P2 of the outer portion 56 of the light receiving side 48. The angle E may be in the range of about 30 degrees to about 60 degrees, and more preferably, in the range of about 40 degrees to about 50 degrees. In some variations, the angle E is about 45 degrees.

In this example, each angled surface 66 extends into the inner portion 54 of the light receiving side 48 by a distance d3 that is no greater than 1.0 mm, and preferably, no greater than 0.5 mm. The radius of curvature r at an apex Z of each angled surface 66 is much, much smaller than the distance d3 that the angled surfaces 66 each extend into the inner portion 54. For example, the radius of curvature r may be no greater than 100 microns, or preferably no greater than 50 microns. In other examples, the radius of curvature r is no greater than 250 microns. Accordingly, the angled surfaces 66 of the light distributor 28 are very accurately manufactured.

Figure 4:
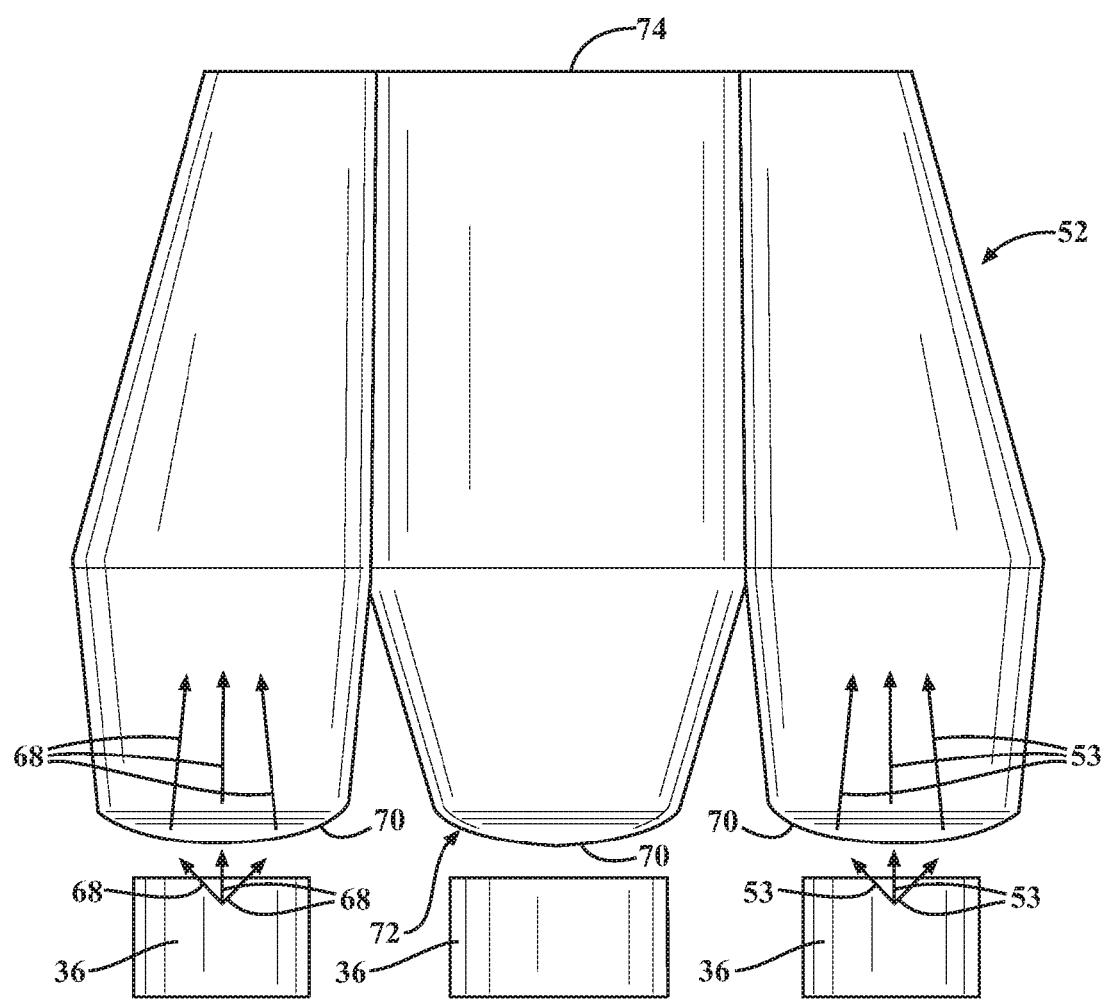
FIG. 4 is a side view of a light-collecting light guide of the instrument cluster assembly shown in FIGS. 1A-3A, according to the principles of the present disclosure.

Referring to FIG. 4, in some examples, in order to efficiently utilize more light from the LED packages 36, the light-collecting light guide 52 is disposed between the plurality of light sources 36 and the light distributor 28. The light-collecting light guide 52 is configured to conduct rays 53, 68 originating with the plurality of light sources 36 to the light distributor 28. The light-collecting light guide 52 may have a plurality of concave surfaces 70 disposed on a light receiving end 72 of the light-collecting light guide 52, in order to focus or collimate the rays 53, 68 toward the light-emitting end 74 of the light-collecting light guide 52. From the light-emitting end 74, the rays 53, 68 are conducted to the light receiving side 48 of the light distributor 28 shown in previous figures.

The light-emitting end 74 is a surface that may comprise surface roughness. The surface roughness on the light-emitting end surface 74 may decrease dependence of the luminance distribution on the angular position of the pointer 12. The surface roughness may also improve the evenness of the pointer illumination.

Accordingly, the example instrument cluster assembly includes a pointer with features (small angled surfaces) that increase the amount of light used, thereby increasing the efficiency of the system. The angled surfaces on an inner side of the light distributor, which is adjacent to the pointer arm, are used to refract rays toward a reflecting surface of the light distributor, in order to reflect the rays into the pointer arm. In this way, light originating from the pointer arm side of the rotational axis is not all wasted. In some cases, about 10-20% or more of the light from the light sources located between the axis of rotation and the distal end of the pointer can be refracted toward the light reflecting surface to be used for illuminating the pointer arm.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A pointer for an instrument cluster assembly of a motor vehicle, the pointer comprising:
    a pointer arm formed of a light conducting material, the pointer arm having a proximal end and a distal end and configured to rotate around an axis; and
    a light distributor disposed at the proximal end of the pointer arm, the light distributor formed of light conducting material, the light distributor having a light receiving side and a light reflecting surface, the light distributor configured to receive rays from a light source through the light receiving side, the light reflecting surface configured to reflect at least a portion of the rays into the pointer arm, the light receiving side having an inner portion and an outer portion, the inner portion being disposed a first distance from the distal end of the pointer arm and the outer portion being disposed a second distance from the distal end of the pointer arm, the second distance being greater than the first distance, the light receiving side inner portion comprising at least three substantially circular, concentric and identically-angled surfaces disposed on the inner portion, the at least three circular, concentric and substantially identically-angled surfaces each being inclined at an angle relative to the axis that is between about thirty degrees and about sixty degrees, the at least three substantially circular, concentric and identically-angled surfaces being configured to refract a portion of the rays toward the light reflecting surface.

2. The pointer of claim 1, wherein the outer portion of the light receiving side is a substantially flat surface.

3. The pointer of claim 2, wherein a first side of the light distributor comprises the top surface and the inner portion of the light receiving side; and a second side of the light distributor comprises the light reflecting surface and the outer portion of the light receiving side.

4. The pointer of claim 3, wherein the at least three substantially angled surfaces of the inner portion of the light receiving side are each disposed at an angle in the range of about 40 degrees to about 50 degrees with respect to a plane perpendicular to the outer portion of the light receiving side.

5. The pointer of claim 4, wherein each of the at least three substantially circular, concentric identically-angled surfaces extend into the inner portion of the light receiving side by a vertical distance that is no greater than 0.5 mm.

6. The pointer of claim 5, wherein a radius of curvature at an apex of each of the at least three substantially circular, concentric and identically-angled surfaces is no greater than 50 microns.

* * * * *